(12) United States Patent
Strowik et al.

(10) Patent No.: US 6,656,076 B2
(45) Date of Patent: Dec. 2, 2003

(54) PRIMARY TRANSMISSION FOR HIGH RPM MOTORS FOR AUXILIARY DRIVE UNITS

(75) Inventors: Willibald Strowik, Remscheid (DE); Elmar Veiser, Köln (DE)

(73) Assignee: ASEC GmbH, Bergneustadt (DE)

( * ) Notice: Subject to any disclaimer, the term of this patent is extended or adjusted under 35 U.S.C. 154(b) by 0 days.

(21) Appl. No.: 10/125,021

(22) Filed: Apr. 18, 2002

(65) Prior Publication Data

US 2002/0115518 A1 Aug. 22, 2002

Related U.S. Application Data

(63) Continuation of application No. 09/528,485, filed on Mar. 17, 2000, now Pat. No. 6,450,913.

(30) Foreign Application Priority Data

Mar. 20, 1999 (DE) ........................................ 299 05 163 U
Feb. 23, 2000 (DE) .......................................... 100 08 175

(51) Int. Cl.[7] .............................................. F16H 1/32
(52) U.S. Cl. ...................................................... 475/178
(58) Field of Search ................................ 475/178, 179, 475/162

(56) References Cited

U.S. PATENT DOCUMENTS

| | | | | |
|---|---|---|---|---|
| 3,975,973 A | * | 8/1976 | Haase ......................... | 475/178 |
| 4,231,551 A | * | 11/1980 | Ikeda ......................... | 475/178 |
| 4,338,830 A | * | 7/1982 | Rodaway ..................... | 475/178 |
| 4,567,790 A | * | 2/1986 | Butterfield et al. .......... | 475/179 |
| 5,123,884 A | * | 6/1992 | Kondoh et al. .............. | 475/179 |
| 5,167,590 A | * | 12/1992 | Kratochvil et al. .......... | 475/178 |
| 5,290,208 A | * | 3/1994 | Minegishi ..................... | 475/178 |
| 5,484,345 A | * | 1/1996 | Fukaya ......................... | 475/178 |
| 6,450,913 B1 | * | 9/2002 | Strowik et al. ............... | 475/179 |

* cited by examiner

*Primary Examiner*—Ankur Parekh
(74) *Attorney, Agent, or Firm*—Friedrich Kueffner

(57) ABSTRACT

A primary transmission has a first eccentric disc coupled in a fixed driving connection to a drive shaft extending into the transmission housing. An internal ring gear is mounted in the housing concentrically to the drive shaft. A first spur gear is supported on the first eccentric disc as a first drive member and meshes with the internal ring gear. The first spur gear has at least one tooth less than the internal ring gear. The diameter of the circle defined by the end of the first spur gear teeth is smaller than the diameter of the circle defined by the base of the internal ring gear teeth. The first eccentric disc has an eccentric throw that corresponds to half a difference of the circle diameters. A driven disc as a second drive member is concentric to the drive shaft and is torque-transmittingly connected to the first spur gear. One of the drive members has at least one axially projecting pin and the other has at least one receiving bore. The receiving bore has a diameter that is greater by the eccentric throw than the pin diameter. A second eccentric disc is mounted in the housing adjacent to the first eccentric disc and coupled to the drive shaft. It is identical to the first eccentric disc and provide mass compensation. The eccentric throws of the two eccentric discs are diametrically opposite one another.

6 Claims, 8 Drawing Sheets

FIG.9

PRIMARY TRANSMISSION FOR HIGH RPM MOTORS FOR AUXILIARY DRIVE UNITS

This application is a continuation application of U.S. application Ser. No. 09/528,485 now U.S. Pat. No. 6,450,913 filed Mar. 17, 2000.

BACKGROUND OF THE INVENTION

1. Field of the Invention

The invention relates to a primary transmission for high rpm (revolutions per minute) motors for auxiliary drive units, wherein an eccentric disc is connected to the drive shaft of the motor so as to rotate with the drive shaft and has supported thereon a spur gear which acts as a first drive member. The outer toothing of the spur gear engages at a location of engagement an inner toothing of a stationarily secured internal ring gear arranged concentrically to the drive shaft. The number of teeth of the spur gear is reduced by at least one relative to the number of teeth of the internal ring gear. The diameter of a circle about the ends of the teeth of the spur gear is smaller by at least one tooth height than the diameter of the circle at the base of the teeth of the internal ring gear. The eccentric throw of the eccentric disc relative to the center of the drive shaft corresponds to half the difference of the diameters of the circle about the ends of the teeth of the spur gear and of the circle about the base of the teeth of the internal ring gear. The spur gear is coupled in a torque-transmitting manner with a driven disc forming a second drive member and concentrically supported relative to the drive shaft. One of the drive members has at least one axially projecting pin which engages a bore of the other drive member, and the bore has a diameter which is greater by the amount of the eccentric throw of the eccentric disc than the diameter of the pin of the former drive member.

2. Description of the Related Art

Primary transmissions with a high reducing rate can be realized on motors especially by employing worm gears. The use of a worm gear, in general, also has the advantage of providing a self-locking action, but is not possible in all cases because an angular drive arrangement results for which there is not enough space available in some situations.

A transmission with high reducing rate is also possible by employing an open planetary gear system in which the planet gear is embodied as a spur gear supported on an eccentric member providing the transmission stay and meshing with a hollow gear at an engagement location. Such a transmission with high reducing rate and self-locking action is, for example, known from U.S. Pat. No. 3,673,891. This patent relates to the use of a rotary movement introduced into a pivot shaft having a fixedly connected eccentric disc for the purpose of pivoting the back rest of a vehicle seat. Similar conditions are also present in a solution disclosed in the U.S. Pat. No. 3,667,804. In this case, there is also a manually actuated drive shaft with a fixedly connected eccentric disc on which a spur gear is supported whose outer toothing meshes with the inner toothing of a stationarily secured ring gear. In the disclosed embodiment, the internal ring gear is a component of a mounting of a seat portion. The spur gear has at one end face thereof three projecting pins which engage bores at the mounting connected to the back rest wherein these bores have an inner diameter which is larger by the amount of the eccentric throw than the outer diameter of the pin. Also, the diameter of the circle extending about the ends of the teeth of the spur gear is smaller by at least one tooth height than the diameter of the circle about the base of the teeth of the internal ring gear. Also, the number of teeth of the spur gear is smaller than the number of teeth of the inner toothing of the internal ring gear. The mounting which is connectable to the back rest pivots exactly about the center point of the pivot shaft because the eccentric movement overlying the rotary movement of the spur gear is compensated completely by the pins engaging the bores in the mounting and having a smaller diameter than these bores. In this prior art configuration which is also a self-locking embodiment, the pivot shaft is manually driven by a hand wheel connected fixedly to the pivot shaft, but it is conceivable to connect the pivot shaft to an electric motor. However, centrifugal forces will result for high rpm motor drives due to the off-center mass arrangement of the eccentric disc which will result in disruptive imbalance.

SUMMARY OF THE INVENTION

It is an object of the present invention to provide a space-saving, motor-driven primary transmission with high reducing ratio in which the mass forces resulting from the imbalances can be compensated by means which are identical to the components serving to transmit the torque.

In accordance with the present invention, this is achieved in that axially adjacent to the eccentric disc supporting the spur gear at least one further eccentric disc identical to the first eccentric disc is provided which ensures mass compensation and which is fixedly coupled to the drive shaft of the motor in such a way that the eccentric throws of the eccentric discs are positioned diametrically opposite one another.

By arranging a second eccentric disc with diametrically oppositely positioned eccentric throw, a second centrifugal force results which counteracts the centrifugal force of the first eccentric disc. Accordingly, the mass forces cancel one another so that even at high rpm at the motor drive shaft quiet running condition of the drive shaft will result. The eccentric discs are both of the same configuration. A primary transmission configured in this way is also self-locking.

For realizing support advantages of the drive shaft, on the one hand, and further mass compensation, on the other hand, a second spur gear is supported on the second eccentric disc. This spur gear also engages the inner toothing of the internal ring gear and acts as a transmission member between the drive members. On the one hand, it has at least one receiving bore for receiving the axially projecting pins of the first drive member and, on the other hand, it has at least one axially projecting pin for engaging a receiving bore of the second drive member in the form of a driven disc.

Even though it is possible to provide a combination of only a single pin at the spur gear and only a single bore at the driven disc for torque transmission, it is advantageous according to the features of the invention to provide the first drive member in the form of the spur gear with several axially projecting pins that are distributed uniformly on a circle which is coaxial to the bearing location of the spur gear and to provide the same number of receiving bores in the driven disc forming the second drive member. The receiving bores are arranged on a circle of the same size as that one on which the pins are arranged. However, the circle on which the bores are arranged is coaxially positioned to the bearing projection of the driven disc supported coaxially relative to the drive shaft in the transmission housing. This holds also true when employing a transmission member which is positioned between the drive members and is in the form of a spur gear. In this case, several axially projecting pins are arranged uniformly on a circle coaxial to the bearing location of the spur gear forming the first drive member. The axially projecting pins engage the same number of receiving bores in the second spur gear forming the transmission member between the drive members. Several pins arranged between the receiving bores project axially from this transmission member and engage corresponding receiving bores of the driven disc supported coaxially to the drive shaft. For the purpose of reducing friction or running noise, it may be advantageous to surround the pins with anti-friction bearings, e.g. plain bearing bushings or roller bearings, which roll on the inner circumference of the receiving bores which are larger by the amount of the eccentric throw than the outer diameter of the bearing bushings or roller bearings, i.e., the pin diameter includes the respective bearing. Moreover, for reducing noise and for ease of running, it may be advantageous to surround the pins with elastic intermediate rings which then receive the plain bearing bushings or roller bearings.

BRIEF DESCRIPTION OF THE DRAWING

In the drawing:

FIG. 9 is a fourth embodiment of a primary transmission according to the present invention in which on the eccentric support shaft two drive members are arranged adjacent to one another having receiving bores which are staggered relative to one another by the respective eccentric throw and are both penetrated by a pin of the driven disc which is an integral part of the driven disc;

DESCRIPTION OF THE PREFERRED EMBODIMENTS

Figure 1:
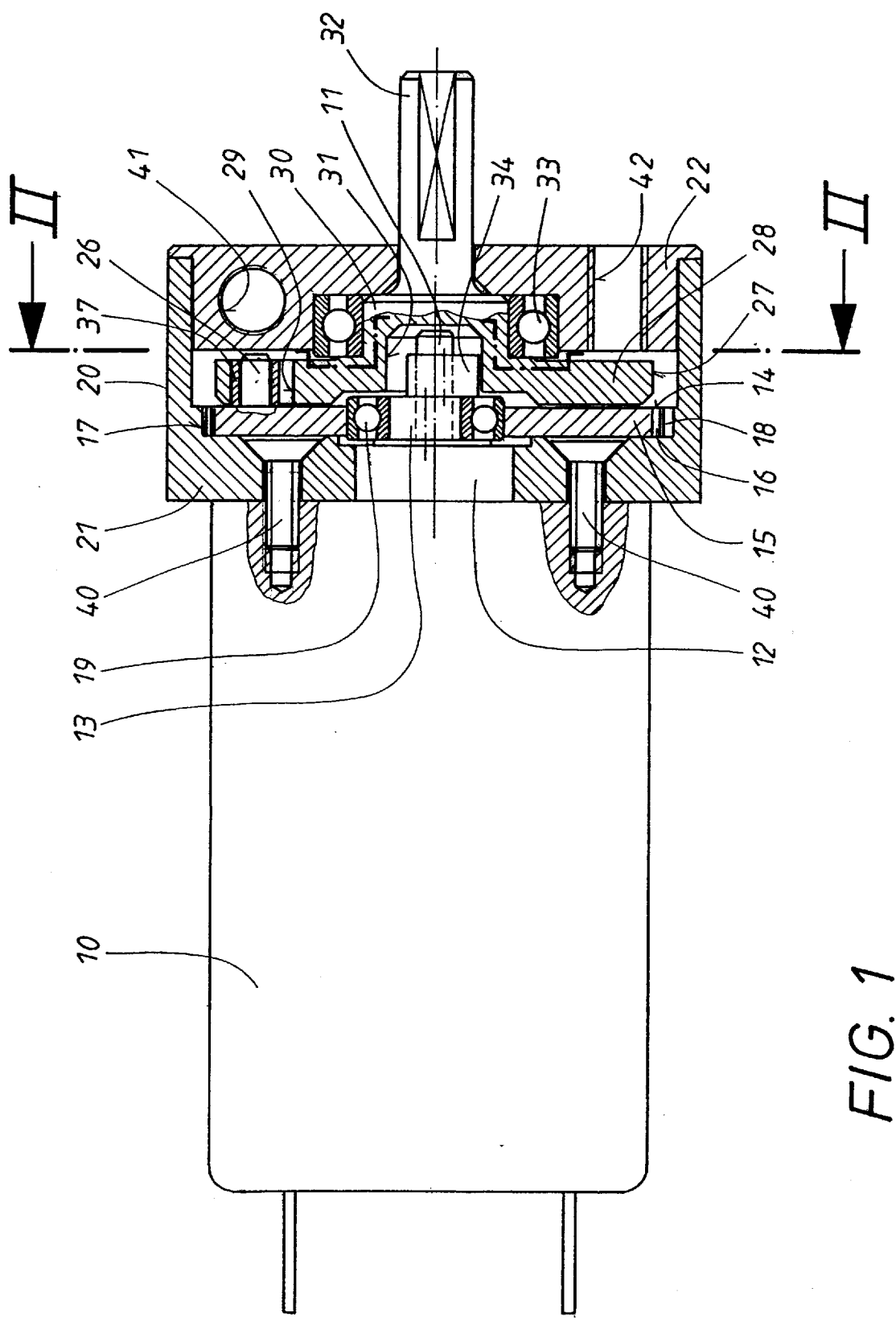
FIG. 1 shows a first embodiment of the primary transmission according to the invention, which is flanged to an electric motor, on an enlarged scale in longitudinal section along the line I—I of FIG. 2.
Figure 2:
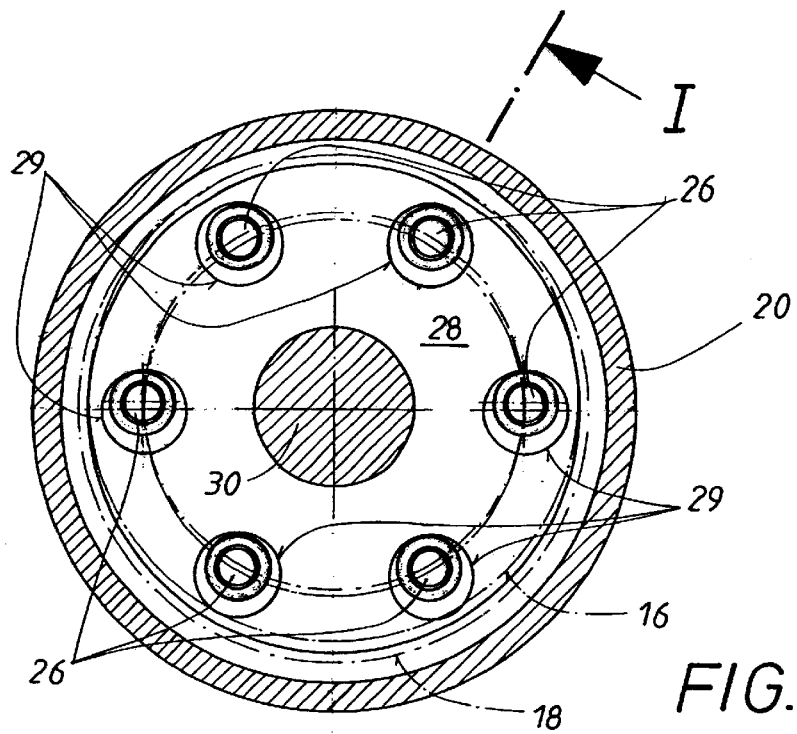
FIG. 2 shows the driven disc arranged in the transmission housing in section along the line II—II of FIG. 1.

In the embodiment of the primary transmission according to the present invention as represented in FIGS. 1 and 2, the torque-transmitting transmission components are encapsulated in a housing 20. This transmission housing 20 is cup-shaped and provided with a bottom plate 21 that is seated on a collar 12 of the electrically operated motor 10 and is moreover secured by screws in a non-rotating manner to the motor 10. A drive shaft 11 projects from the collar 12 of the motor 10 and has a cross-section suitable for rotating engagement. Such a cross-section is realized, for example, by having two flat longitudinal sides. An eccentric disc 13 is fixedly arranged on the drive shaft 11. A first drive member 14 in the form of a spur wheel 15 is rotatably supported on the eccentric disc 13 with interposition of, for example, a roller bearing 19. The outer toothing 16 of the spur gear 15 meshes at a location of engagement with the inner toothing 18 of an internal ring gear 17 which is a component of the cup-shaped housing 20, i.e., the inner toothing 18 is mounted on the inner circumference of the cup-shaped housing 20. Several pins 26 project in the axial direction from the end face of the spur gear 15 facing away from the motor 10. In the shown embodiment, as can be seen in FIG. 2, six such pins 26 are provided which are uniformly distributed in the circumferential direction. Even though it is not absolutely required to surround or enclose the pins 26 by bushings, the pins 26 represented in FIGS. 1 and 2 are provided with plain bearing bushings 37 at their circumference with which the pins 26 engage bores 29 of the driven disc 28 acting as the second drive member 27. This driven disc 28 has a bearing projection 30 at its central area. The projection 30 has an extension in the form of a shaft stump 32 which projects from the housing 20 coaxially to the drive shaft 11. The bearing projection 30 of the driven disc 28 is surrounded by a roller bearing 33 which is supported in a bearing cover 22 which is secured in the cup-shaped housing 20 and closes it off. A further eccentric disc 34 is fixedly connected on the drive shaft 11 adjacent to the eccentric disc 13 in such a way that the maximum eccentric throw of the eccentric disc 34 is positioned diametrically opposed to the maximum eccentric throw of the eccentric disc 13. This eccentric disc 34, which is provided for the purpose of mass compensation relative to the drive shaft 11, engages the recess 31 in the driven disc 28 and its bearing projection 30 such that play is provided between the inner circumference of the recess 31 and the eccentric disc 34.

As already mentioned before, the bores 29 in the driven disc 28 are dimensioned such that they are larger by the eccentric throw than the outer diameter of the bearing bushings 37 surrounding the pins 26. Moreover, it should be mentioned that the bearing cover 22 has multiple fastening bores 41 and 42 with which the primary transmission and the motor 10 fixedly connected thereto can be mounted on frame parts, for example, of vehicles.

Upon rotation of the drive shaft 11 the eccentric discs 13 and 34 are also rotated. The eccentric disc 13, in the embodiment represented in FIG. 1, also eccentrically drives the spur gear 15 so that the location of engagement of the outer toothing 16 relative to the inner toothing 18 of the stationary internal ring gear 17 will revolve circumferentially. For a difference of only one tooth between the outer toothings 16 of the spur gear 15 and the inner toothing 18 of the internal ring gear 17, one rotation of the drive shaft 11 rotates the spur gear 15 only by one tooth spacing and this rotary movement is also applied to the driven disc 28 which thus rotates by the same rotational angle as the spur gear 15. Accordingly, the greater the tooth number of the inner toothing 18, the higher the reducing ratio of the transmission.

Figure 4:
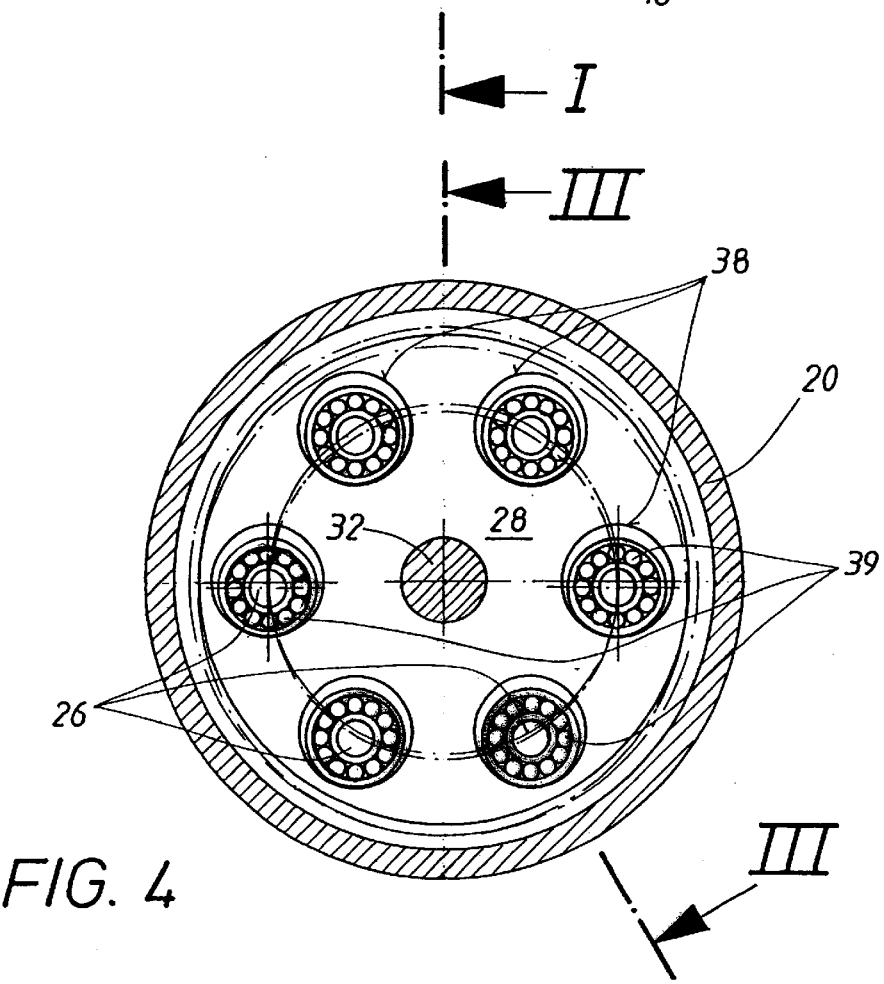
FIG. 4 shows the driven disc of the embodiment represented in FIG. 3 arranged in the transmission housing in a sectional view according to the line IV—IV of FIG. 3.
Figure 3:
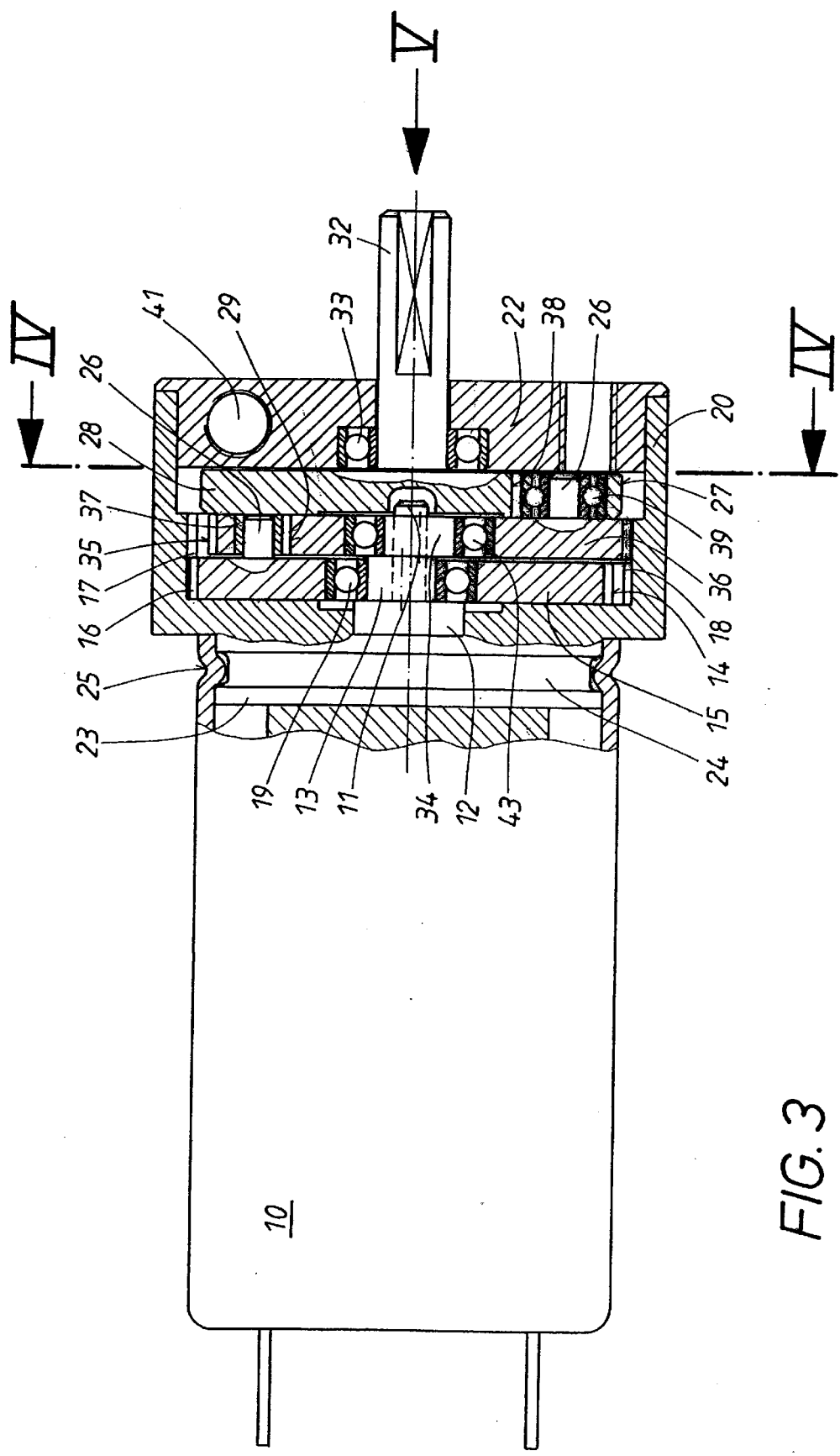
FIG. 3 shows a second embodiment of a primary transmission according to the present invention in a longitudinal section along the line III—III of FIG. 4, wherein a transmission member in the form of a spur gear is arranged between the first drive member and the second drive member.
Figure 5:
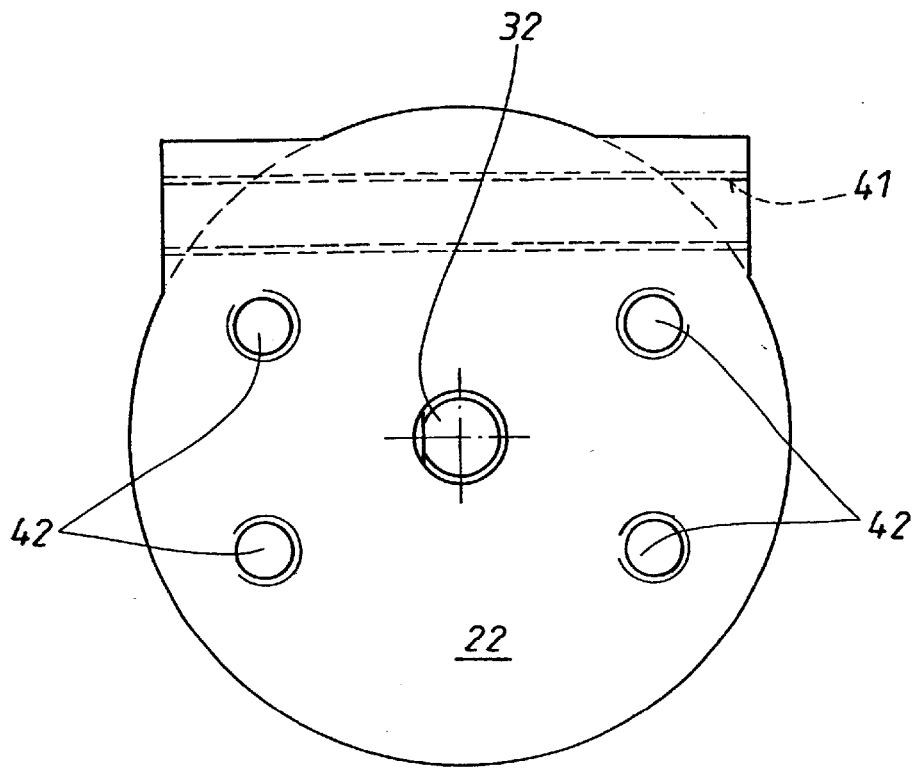
FIG. 5 shows the primary transmission according to the present invention in an end view onto the driven side.

The embodiment represented in FIGS. 3 and 4 has a transmission member 35 in the form of a further spur gear 36 positioned between the spur gear 15, supported on the eccentric disc 13 via the roller bearing 19 and forming the first drive member 14, and between the second drive member 27 in the form of the driven disc 28 that is supported on the bearing 33 within the bearing cover 22. This spur gear 36 matches with regard to its dimensions and the number of teeth the spur gear 15. The spur gear 36 is supported on the eccentric disc 34 wherein a further roller bearing 43 may be positioned between the bearing bore of the spur gear 36 and the eccentric disc 34 on which it is mounted. The spur gear 36 is arranged such that, in comparison to the tooth engagement location of the spur gear 15, it is positioned exactly diametrically opposite at the inner toothing 18 of the internal ring gear 17 and is secured in this position by the eccentric disc 34.

In contrast to the spur gear 15 the spur gear 36 forming the transmission member 35 has bores 29 which can be engaged by the pins 26 surrounded by plain bearing bushings 37. The bores 29 and the plain bearing bushings 37 are dimensioned as disclosed above. Pins 26 also project from the end face of the spur gear 36, functioning as a transmission member 35, at a side facing away from the motor 10. These pins may be surrounded by plain bearing bushings 37 or by roller bearings 39, as shown in FIG. 3, and engage bores 38 of the driven disc 28 forming the second drive member 27. It is understood that the solution with respect to the arrangement of roller bearings 39 on the pins 26 is not limited to their arrangement in the driven disc 28. Instead, it is possible that all pins 26, also those of the spur gear 15, are provided with roller bearings 39 in place of the plain bearing bushings 37.

In contrast to the solution illustrated in FIG. 1, in which the primary transmission is a flanged transmission connected by screws 40 to the motor 10, the connection between the primary transmission and the motor can also be in the form of an integrated transmission. For this purpose, the bottom plate 21 of the cup-shaped housing 20 is provided with a ring projection 23 having an annular groove 24 into which an annular embossed projection 25 provided in the mantle of the motor 10 is pressed.

The operation of the embodiment of the primary transmission illustrated in FIGS. 3 and 4 is analog to the operation of the embodiment of the primary transmission according to the invention as illustrated in FIGS. 1 and 2.

Figures 6, 7:
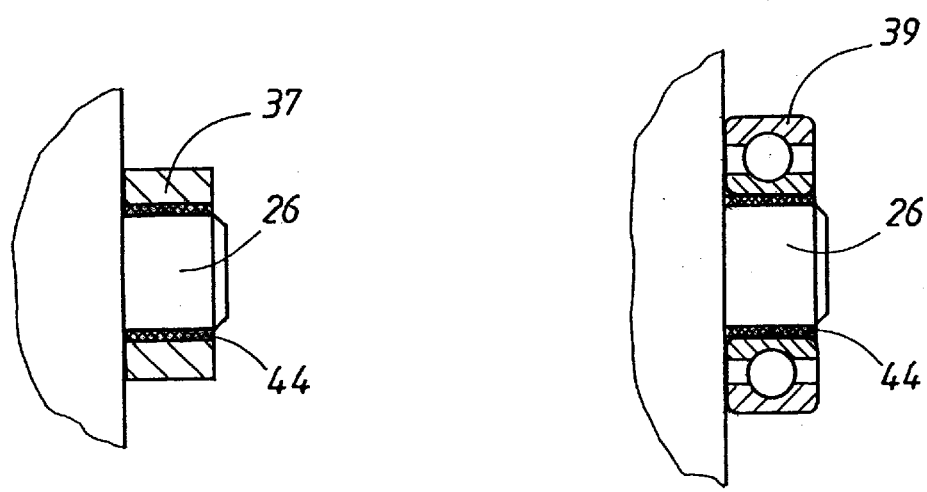
FIG. 6 shows on an enlarged scale relative to FIGS. 1 through 5 a pin projecting from the first drive member or the transmission member, wherein the pin is surrounded by an elastic intermediate member on which the plain bearing bushing is arranged.
FIG. 7 shows another embodiment of a pin on the first drive member or the transmission member, on a scale analog to that of FIG. 6, wherein the pin is also surrounded by an elastic intermediate member on which, however, a roller bearing is supported.

In the embodiments illustrated in FIGS. 6 and 7, the pins 26 are surrounded by elastic intermediate rings 44 on which, as shown in FIG. 6, plain bearing bushings 37 are supported or, as shown in FIG. 7, roller bearings 39 are seated. These measures are provided for noise reduction as well as tolerance compensation.

Figure 8:
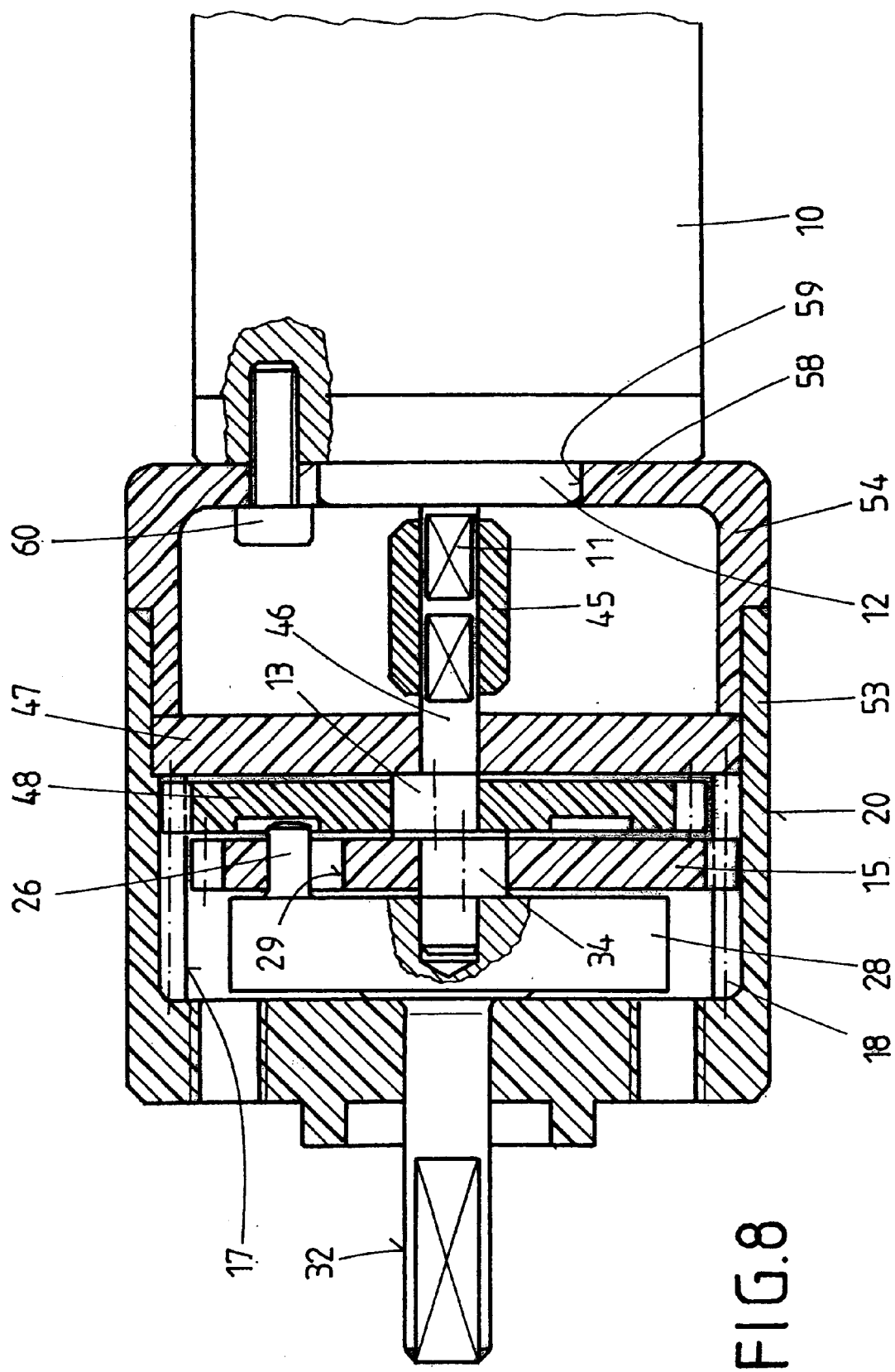
FIG. 8 shows a third embodiment of a primary transmission according to the present invention in which a revolving support member in the form of a gear wheel is arranged adjacent to one of the drive members and the eccentric discs are components of an eccentric support shaft which is coupled to the drive shaft of the motor and which penetrates a housing plate.

The primary transmission illustrated in FIG. 8 has a housing 20 that is comprised of two connectable cup-shaped housing halves 53 and 54 which can be made for example, of synthetic material and are connected to one another. This connection can be of a conventional design such as a screw connection, adhesive connection, snap connection etc. The housing half 54 has a bottom part 58 with an opening 59 into which the collar 12 of the electric motor 10 can be inserted. The bottom part 58 can be fastened to the motor by fastening screws 60. The drive shaft 11 of the motor 10 projecting into the interior of the housing 20 is fixedly connected by a clutch 45 to the eccentric support shaft 46. The eccentric support shaft 47 is supported in a housing plate 47 extending transversely in the housing 20 and in the driven disc 28 which is in turn supported by the shaft stump 32 projecting from the housing 20 in the bottom part of the cup-shaped housing half 53. The driven disc 28 comprises at least one pin 26 projecting into the interior of the housing 20 and engaging a receiving bore 29 of the spur gear 15 supported on the eccentric disc 34 of the eccentric support shaft 46. This receiving bore 29, as mentioned above, has a diameter that is larger by the eccentric throw than the diameter of the pin 26. However, it is understood, that, as described above, more than one pin 26 can project from the driven disc 28 and that a correspondingly matching number of bores 29 can be arranged in the spur gear 15. This spur gear 15 engages with its outer toothing the inner toothing 18 of the internal ring gear 17 provided at the inner housing circumference. Upon rotation of the eccentric shaft 46, the two tooth engagement locations revolve in the same manner as the eccentric disc 34 so that in accordance with the difference between the toothing of this spur gear 15 and the toothing of the internal ring gear 17 the driven disc 28 is further rotated by the receiving bore 29 and the axially projecting pin 26 engaged therein. This means that, for a difference of one tooth between the tooth number of the spur gear 15 and the tooth number of the internal ring gear 17, the driven disc 28 and thus also its shaft stump 32 is rotated by one tooth spacing when the eccentric support shaft 46 carries out one revolution.

On the eccentric disc 13 positioned adjacently to the eccentric disc 34 a further support gear 48 is mounted which also engages the inner toothing 18 of the internal ring gear 17. The tooth engagement location of the support gear 48 revolves in the same way as disclosed in connection with the spur gear 15. However, the revolution of this support gear 48 is without effect on the driven disc 28 because the support gear 48 has no connection to the pins 26. It is provided with an annular groove at its end face which allows unimpaired movement of the pins 26 relative to the support gear 48. This support gear 48 provides, on the one hand, a support action for the eccentric support shaft 46 and, on the other hand, mass compensation. In the primary transmission illustrated in FIG. 8, all bearing locations are in the form of plain bearings in order to reduce cost and no bearing bushings are used. Instead, except for the metallic components, the eccentric support shaft 46, and the driven disc 28, all other components are made of a synthetic material (plastic) having anti-friction properties.

Figure 9:
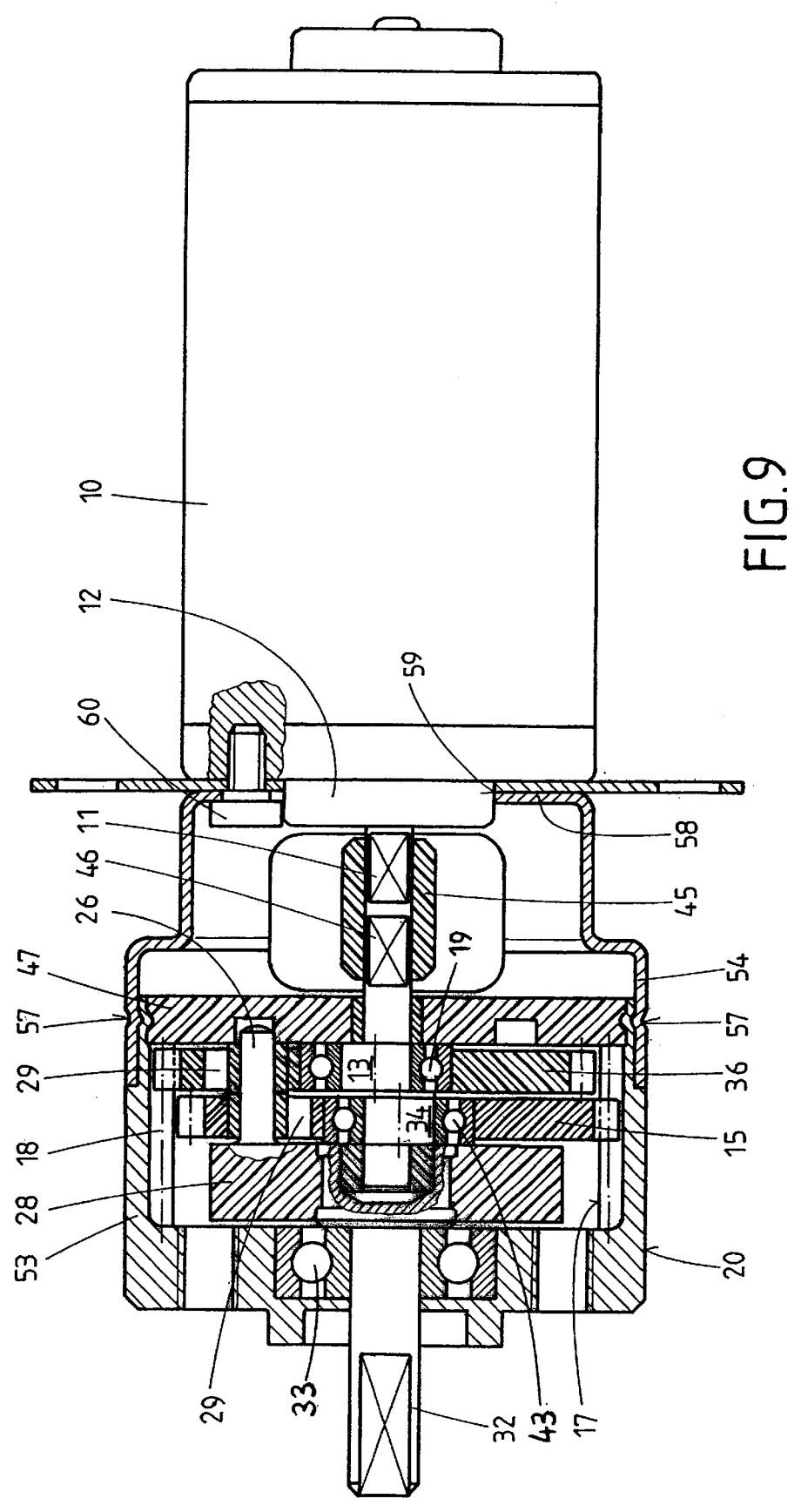

The embodiment of a primary transmission according to the present invention as illustrated in FIG. 9 has been modified in comparison to the primary transmission represented in FIG. 8. In this modification two spur gears 15 and 36 are used which both function as drive members and therefore are provided with bores 29 equidistantly radially spaced from the respective eccentric center point of the eccentric discs 13 and 34, wherein both bores 29 are penetrated by a common pin 26. It is understood that instead of the represented single pin 26 also several uniformly circumferentially distributed pins can be provided on the driven disc, and a matching number of bores 29 is then provided in each one of the two spur gears 15, 36. The spur gears 15 and 36 are supported in analogy to FIG. 3 via roller bearings 19, 43 on the eccentric discs 13, 34. The eccentric support shaft 46 itself is supported by bearing bushings, on the one hand, in the housing plate 47 and, on the other hand, in the driven disc 28 which itself, in analogy to FIG. 3, is supported with its shaft stump 32 by roller bearing 33 in the bottom part of the housing half 53 of the housing 20. The shaft stump 32 which is preferably made of metal is preferably embedded in the driven disc 28 made of plastic material which is possible, for example, by injection molding the driven disc about the respective shaft part of the shaft stump 32. In the embodiment illustrated in FIG. 9, the pin 26 shown in this Figure can be surrounded by plastic bushings which engage the receiving bores 29 of the spur gear 15 and 36. When using several axially projecting pins 26 arranged on the same circle, they can all be surrounded by bushings. The housing plate 47 adjacent to the eccentric disc 13 has an annular groove facing the spur gears and arranged such that the pin ends which project past the spur gear 36 engage with play this annular groove so that the rotational movement of the pins 26 is not impaired. In the embodiment shown in FIG. 9, the cup-shaped housing half 54 flanged to the electric motor 10 is secured to the housing half 53 by radially embossed portions 57. The at least partially applied embossed connection is also used to secure the housing plate 47 to the housing half 53.

Figure 10:
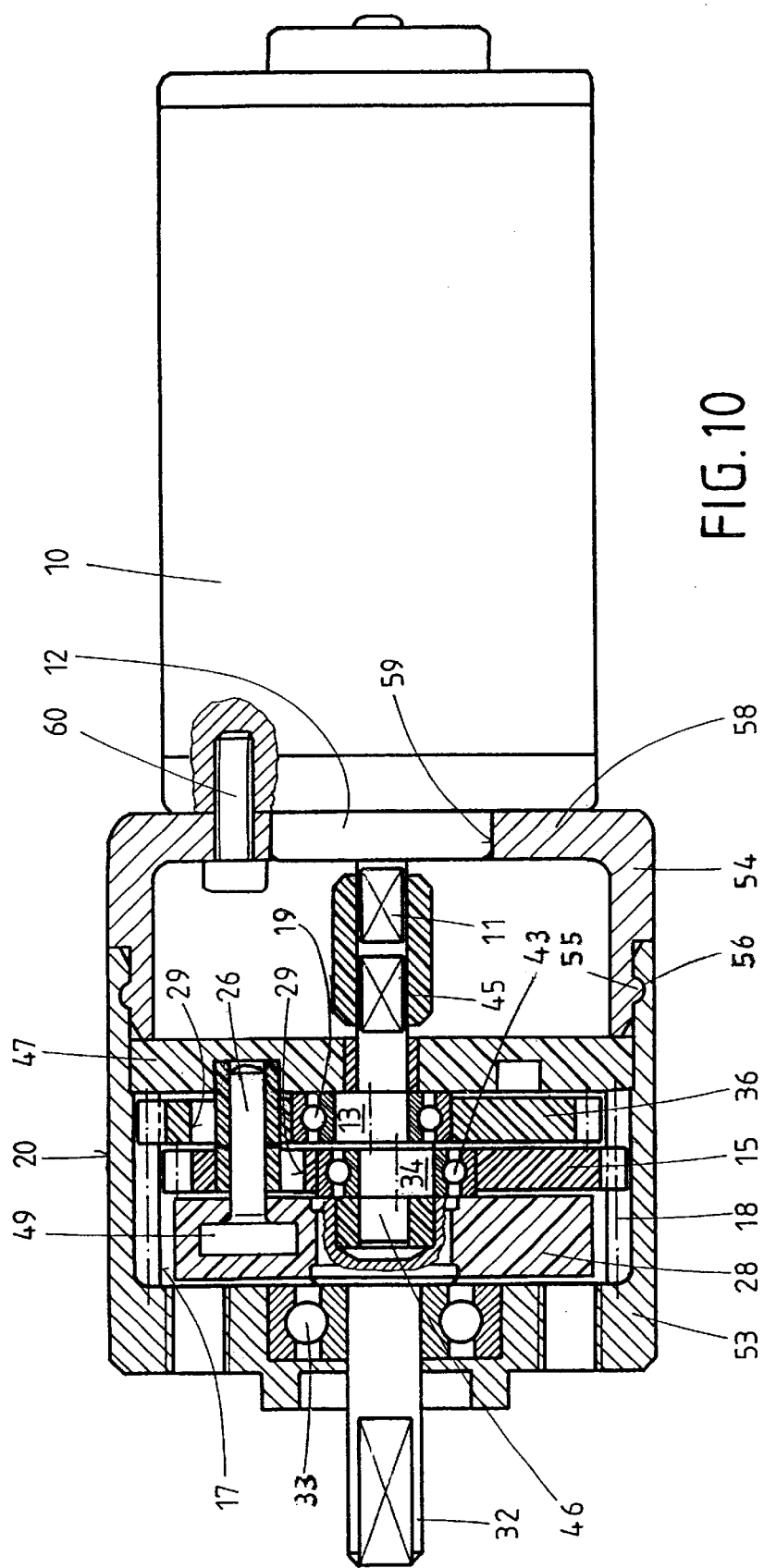
FIG. 10 is a modification of the embodiment of FIG. 9 wherein the pin penetrating the drive members is comprised of a material different from the material of the driven disc and is inserted into the driven disc.

The primary transmission according to the invention illustrated in FIG. 10 corresponds substantially to that already disclosed in connection with FIG. 9. However, the axially projecting pins 26 are made of a metallic material and are embedded with an end 49 having a greater diameter than the projecting pin end, in the same manner as the shaft stump 32, in the driven disc 28 made of plastic. In this solution, the two spur gears 15 and 36 are also used as torque-transmitting drive members. A further difference of the embodiment as represented in FIG. 10 in comparison to that of FIG. 9 is that the cup-shaped housing halves 53 and 54 are connected to one another by snap members 55 and counter snap members 56.

Figure 11:
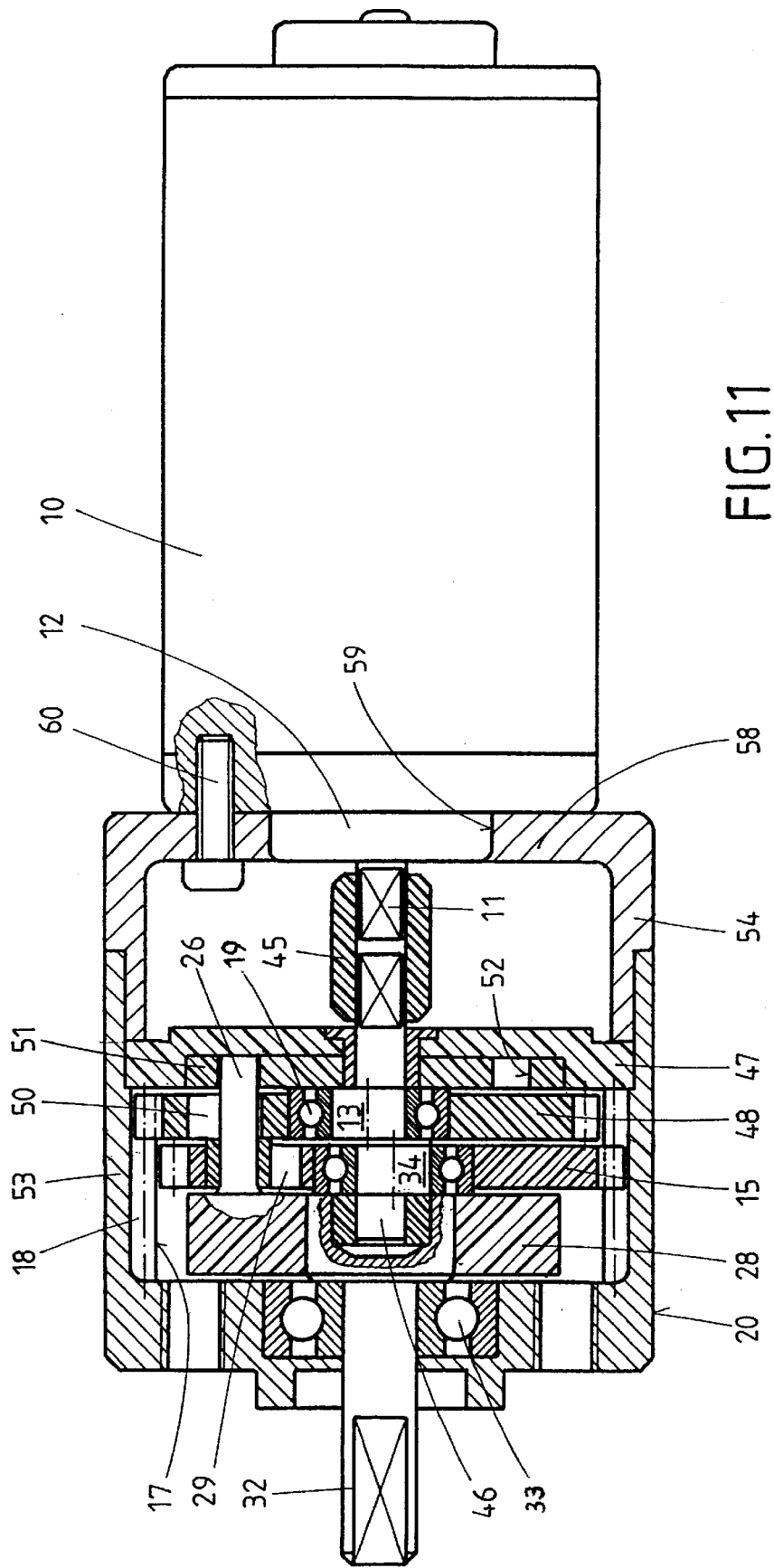
FIG. 11 shows yet another embodiment of the primary transmission according to the present invention in which only one spur gear acts as a drive member while the adjacently arranged spur gear is a support gear which rotates without contacting the penetrating pins, wherein the pin is supported in a bearing disc that is rotatably arranged in the housing plate.

The embodiment represented in FIG. 11 of a primary transmission according to the present invention corresponds in its operation to that of FIG. 8. The throughbore 50 in the support gear 48 has nowhere contact with the axially projecting pin 26 penetrating the receiving bore 29 and the bore 50, wherein the axially projecting pin 26, in contrast to the previous embodiments, is supported with the end projecting from the driven disc 28 in bearing bores 52 of a bearing plate 51. This bearing plate 51 is supported in a matching circular recess of the housing plate 47 and additionally supports the free end of the pin 26. The other components illustrated in FIG. 11 corresponds substantially to those represented in FIGS. 9 and 10.

While specific embodiments of the invention have been shown and described in detail to illustrate the inventive principles, it will be understood that the invention may be embodied otherwise without departing from such principles.

What is claimed is:

1. A primary transmission for motors operating at high rpm for auxiliary drive units, the primary transmission comprising:
   a housing;
   a drive shaft projecting into the housing;
   a first eccentric disc mounted in the housing so as to be coupled in a fixed driving connection with the drive shaft;
   an internal ring gear stationarily mounted in the housing concentrically to the drive shaft;
   a first spur gear supported on the first eccentric disc, the first spur gear configured to act as a first drive member;
   the first spur gear having an outer toothing cooperating with an inner toothing of the internal ring gear at a location of engagement;
   the first spur gear having teeth and the internal ring gear having teeth, wherein the first spur gear has at least one tooth less than the internal ring gear;
   wherein a circle extending through the end of the teeth of the first spur gear has a first diameter and wherein a circle extending through the base of the teeth of the internal ring gear has a second diameter, wherein the first diameter is smaller by at least one tooth height than the second diameter;
   wherein the first eccentric disc has an eccentric lift relative to a center of the drive shaft corresponding to half a (difference between the first and the second diameters;
   a driven disc forming a second drive member and arranged concentrically to the drive shaft, the second drive member torque-transmittingly connected to the first spur gear;
   wherein the second drive member has a plurality of axially projecting pins and wherein the first drive member has a plurality of receiving bores wherein the axially projecting pins engage the receiving bores;
   the receiving bores having a bore diameter and the axially projecting pins having a pin diameter, wherein the bore diameter is greater by the eccentric lift of the eccentric disc than the pin diameter;
   at least one second eccentric disc mounted in the housing axially adjacent to the first eccentric disc so as to be coupled in a fixed driving connection with the drive shaft, wherein the at least one second eccentric disc is identical to the first eccentric disc and is configured to compensate mass, wherein the eccentric nose of the first eccentric disc and the eccentric nose of the second eccentric disc are positioned diametrically opposite one another;
   a second spur gear supported on the second eccentric disc and having a size matching the size of the first spur gear and engaging the internal ring gear, wherein the first eccentric disc with the first spur gear is positioned directly adjacent to the second drive member and the second eccentric disc with the second spur gear is positioned on a side of the first spur gear remote from the second drive member, and wherein the second spur gear is not connected to the axially projecting pins.

2. The primary transmission according to claim 1, wherein the bearings for the driven disc in the housing, for the eccentric disc in the drive member and in the housing plate of the housing as well as the bearing locations of the axially projecting pins in the receiving bores are formed as plain bearings without bearing bushings.

3. The primary transmission according to claim 1, further comprising an eccentric support shaft on which the first and second eccentric discs are mounted, and a shaft stump mounted in the second drive member and made of a material different from the material of the second drive member, wherein the eccentric support shaft is mounted in the shaft stump.

4. The primary transmission according to claim 1, wherein the axially projecting pins are made of a material different from the material of the second drive member and are mounted in the second drive member.

5. The primary transmission according to claim 1, wherein the axially projecting pins have a widened portion at one end and the widened portion is embedded in the second drive member.

6. The primary transmission according to claim 1, wherein the second spur gear has throughbores configured to receive the axially projecting pins, wherein the throughbores have a diameter allowing free movement of the axially projecting pins, wherein the axially projecting pins penetrate the first spur gear as well as the second spur gear.

* * * * *